Patented Aug. 18, 1925.

1,550,232

UNITED STATES PATENT OFFICE.

EDWARD L. AIKEN, OF EAST ORANGE, NEW JERSEY, ASSIGNOR TO CARBOLOID PRODUCTS CORPORATION, OF HASTINGS-ON-THE-HUDSON, NEW YORK.

PROCESS OF MAKING SHOE LASTS.

No Drawing.   Application filed April 20, 1923.   Serial No. 633,567.

*To all whom it may concern:*

Be it known that I, EDWARD L. AIKEN, a citizen of the United States, residing at East Orange, in the county of Essex, State of New Jersey, have invented certain new and useful Improvements in Processes of Making Shoe Lasts, of which the following is a description.

Heretofore shoe lasts have been made from good grades of hard wood, maples being the usual kind chosen. It has been found that no matter how carefully the wood has been seasoned and treated, that such treatment by materials heretofore known will not impregnate the wood sufficiently to prevent the shoe last from being affected by changes in temperature or hygroscopic conditions of the atmosphere, and that a shoe constructed from a last on one day will vary considerably from a shoe constructed from the same last at another time when the weather and temperature conditions are different. Furthermore the treatment of a wood last by a filler, such as ingredients which yield a chemical condensation product, should leave the outer surface of the last in such a condition that tacks may be readily driven into the last. Consequently it follows that such a material must always remain in a somewhat flexible condition and after much study and many tests, I have found that a plastic material, consisting of a condensation product of a phenyl glyceryl body and active methylene, a product of my own invention, as set forth in my application, Ser. No. 502,796, filed September 21, 1921, or a product consisting of a condensation product of oxy-aromatic alcohol and a cyclic ether of a polyhydric alcohol, such as disclosed by application Ser. No. 558,783, filed May 5, 1922, by Leslie T. Sutherland, and both known in the trade as "carboloid", is the only material which will satisfactorily impregnate the wood or a form made of wood pulp or other fibrous material and meet the conditions above set forth.

The reason for this is that carboloid in its normal condition is a thin liquid containing no solvent and in such state, wood or other fibrous materials can be thoroughly impregnated to any degree of impregnation by any of the well-known processes. This is not true of any resins or gums that have to be dissolved in a solvent; owing to the fact that wood or other fibrous materials act as filters and it has been found that the solvent in the impregnating material drives in ahead, leaving the heavier bodies near the surface. Furthermore in practice, it is necessary to remove this solvent before indurating the wood, and of course, after the pores of the fibrous material are filled up, to remove any portion of what fills them, leaves only partial impregnation and protection from atmospheric conditions.

A suggested method of wood impregnation has been to introduce phenol and formaldehyde or the latter in the state of an aqueous solution known as formalin into the wood or other fibrous material and then cause a reaction to take place between the phenol and formaldehyde after the impregnation of the fibrous body. This is clearly impractical and I believe it is even impossible to produce a satisfactory result for the following reason: Formaldehyde, being a gas, is dissolved in water and is so used commercially under the name of formalin, which is mixed with the phenol in definite proportions and the resultant mixture being used to impregnate the fibrous body. This body is thus impregnated with a material that is not in perfect solution, inasmuch as all the phenol will not dissolve in the amount of water carried by the formaldehyde gas. The fibrous nature of wood will act as a filter and will tend to separate the phenol from the formalin to some extent, thereby destroying the uniform mixture throughout the wood or fibrous body. In addition, the water being a solvent would drive faster and further into the body than the original mixture. This would further tend to separate and make the mixture uneven and finally, before condensation can take place between the phenol and formaldehyde, it will be necessary to remove the solvent, water. This can only be done by applying some degree of heat causing vaporization of the water. In doing this it is certain that a very large quantity of the formaldehyde gas will be removed with the water, thereby destroying the proper chemical balance of formaldehyde and phenol necessary to make a satisfactory condensation product. Furthermore if enough heat be applied to remove the water in a reasonable time, the chemical reaction is very likely to start between the phenol and formaldehyde and as this reaction generates a considerable amount of heat especially when confined, it would become violent and convert the water into steam causing pressures and in all probabilities the whole piece would be expanded to such a degree as to disrupt the fibres of the material impregnated; in any event, the water would not be all removed from the body.

These difficulties are overcome by using carboloid which as stated contains, in its normal condition, no solvent, so that the impregnation is direct and positive and the curing process leaves the fibrous material completely full of a substance impervious to moisture, ordinary solvents and temperature changes.

However, instead of utilizing a piece of wood and impregnating this with carboloid, I have discovered a cheaper and better process of making a shoe last which consists in first forming from paper pulp the rough shape in suitable moulds, drying out the water, then impregnating the rough shape with a liquid binder such as carboloid, that will harden through chemical action induced by heat without distortion; then pressing the impregnated rough shape in a suitable form or mould to a finished or semi-finished shape, applying heat while under pressure in the mould to induce a chemical change in the binder that will change its physical shape to a solid and firmly bind the pulp into a solid mass. After thus being cured it can be machined in the same manner as the wood lasts are now machined to produce a finished product. I have found that by using carboloid in impregnating the pulp forms, I may harden them in open ovens by the application of heat without pressure or without confining them in moulds but, of course, the method heretofore outlined will produce a quicker and more even product and it is, therefore, to be preferred.

After the machining is finished then the last is treated with a coating of carboloid to fill the surface and produce a filler which will take a high polish, yet leaving the last in a condition in which the shoe tacks or nails can be readily driven and still the material through which the tacks or nails are driven will not chip off, which condition would destroy the usefulness of the last. I have found that it is impossible to use a sealing coat of phenol-formaldehyde varnish or similar product for the reason that the chemical reaction will take place even at a normal room temperature, although, of course, more slowly than in the presence of heat, yet nevertheless in a comparatively short time a hard brittle surface will be obtained; whereas the carboloid will stay almost indefinitely in a semi-flexible condition.

In order to carry out this process a form or mould is made having a contour approximately the same as the finished last, except in volume it will be greater to allow space enough for a sufficient quantity of the roughly formed pulp. The mould is placed in a press and the pulp, carried in water, is forced into it. After the mould is filled and the excess water is forced out, the rough-shaped pulp last is removed from the mould and thoroughly dried in ovens to remove all moisture. After drying, the rough shape is impregnated with a liquid binder preferably carboloid either in its normal liquid state in which there is no solvent or under some conditions the normal liquid may be dissolved in a solvent as methyl or denatured alcohol, as I have found that it is not necessary in all cases to use the normal carboloid liquid, which would be more expensive; so that, after impregnation in which a solvent is used, this solvent must be removed by any of the wellknown methods, and can be removed without driving out the carboloid.

The rough impregnated shape is next put into moulds and submitted to a pressure ranging from about 300 or more pounds to the square inch of surface to be pressed in order to firmly compact the pulp to the desired shape and size for final machining. Heat is applied in any wellknown manner. Preferably the moulds are placed in ovens where the heat will penetrate uniformly to promote the action of curing or hardening the binder. The temperature preferably used is from 100 to 110 degrees centigrade and the time of curing, when using carboloid as a binder, is from 10 to 12 hours. Higher or lower temperatures may be used with a corresponding decrease or increase of time required to cure. Care being taken, however, not to use a temperature that will burn or char the pulp. After the lasts are cured and removed from the mould, they are then machined to their finished shape, after which they are treated with a coating of carboloid as and for the purposes already described.

Having thus described my invention, what I claim is:

1. The process of making a shoe last, which consists in first forming in a mould a rough shape of paper pulp, then drying out the water, impregnating the rough shape with a liquid binder capable of undergoing a chemical change, said binder, after the chemical change has taken place, being semi-flexible at normal room temperature, pressing the rough shape in a mould to a semi-finished shape, at the same time applying heat to induce a chemical change in the binder changing it and the mass to a solid, then machining to substantially a finished size, applying a coating of carboloid to the outer surface of the last and finally polishing the last after said outer coating has cured.

2. The process of making a shoe last, which consists in first forming in a mould a rough shape of cellulose pulp, then drying out the water, impregnating the rough shape with a binder of liquid carboloid, pressing the rough shape in a mould to a semi-finished shape, at the same time applying heat to induce a chemical change in the carboloid binder, changing it and the mass to a solid, then machining to substantially a finished size, applying a coating of carboloid to the outer surface of the last and finally polishing the last after said outer coating has cured.

3. The process of making a shoe last, which consists in first forming in a mould a rough shape of cellulose pulp, then drying out the water, impregnating the rough shape with a liquid binder capable of undergoing a chemical change, said binder, after the chemical change has taken place, being semi-flexible at normal room temperature, removing any solvent that may be then present in the impregnated rough shape, pressing the rough shape in a mould to a semi-finished shape, at the same time applying heat to induce a chemical change in the binder, changing it and the mass to a solid form, then machining to substantially a finished size, applying a coating of material to the outer surface of the last which material will allow tacks to be driven therethrough but will never harden to a brittle point and finally polishing the last after said outer coating has cured.

4. The process of making a shoe last, which consists in first forming in a mould a rough shape of cellulose pulp, then drying out the water, impregnating the rough shape with a liquid binder capable of undergoing a chemical change, said binder, after the chemical change has taken place, being semi-flexible at normal room temperature, removing any solvent that may be then present in the impregnated rough shape, pressing the rough shape in a mould to a semi-finished shape, at the same time applying heat to induce a chemical change in the binder, then curing the product in a mould by a continuation of heat for several hours of from 100 to 110 degrees C., then machining to substantially a finished size, applying a coating of material to the outer surface of the last which material will allow tacks to be driven therethrough but will never harden to a brittle point and finally polishing the last after said outer coating has cured.

5. The process of making a shoe last, which consists in first forming in a mould, a rough shape of cellulose pulp, then drying out the water, impregnating the rough shape with a liquid binder capable of undergoing a chemical change, said binder, after the chemical change has taken place, being semi-flexible at normal room temperature, removing any solvent that may be then present in the impregnated rough shape, pressing the rough shape in the mould to a semi-finished shape, at the same time applying heat to induce a chemical change in the binder, curing the product in the moulds at a temperature below that which will char the pulp until the mass has become hardened, then machining to sustantially a finished size, applying a coating of material to the outer surface of the last which material will allow tacks to be driven therethrough but will never harden to a brittle point and finally polishing the last after said outer coating has cured.

6. The process of making a shoe last, which consists in first forming in a mould, a rough shape of paper pulp, then drying out the water, impregnating the rough shape with a liquid binder of carboloid, pressing the rough shape in the mould to a semi-finished shape, at the same time applying heat to induce a chemical change in the carboloid binder, curing the materials in the moulds to a hardened state at a temperature which will not char the pulp, then machining to substantially a finished size, applying a coating of carboloid to the outer surface of the last and finally polishing the last after said outer coating has cured.

7. The process of making a shoe last, which consists in first forming in a mould a rough shape of fibrous pulp, then drying out the water, impregnating the rough shape with a liquid binder capable of undergoing a chemical change without distorting the impregnated body, but which in the changed state will permit tacks or nails to be driven thereunto without chipping, pressing the rough shape in a mould to a semi-finished shape, at the same time applying heat to induce a chemical change in the binder changing it and the mass to a solid, then machining to substantially a finished size, applying a coating of the impregnating material to the outer surface of the last and finally polishing the last after said outer coating has cured.

8. The process of making a shoe last, which consists in first forming in a mould a rough shape of fibrous pulp, then drying out the water, impregnating the rough shape with a liquid binder which is impervious to moisture, ordinary solvents and temperature changes, yet capable of undergoing a chemical change without distorting the impregnated body, but which in the changed state will permit tacks or nails to be driven thereunto without chipping, pressing the rough shape in a mould to a semi-finished shape, at the same time applying heat to induce a chemical change in the binder, changing it and the mass to a homogeneous solid, then machining and polishing the resulting product to a finished last.

9. The process of making a shoe last, which consists in first forming in a mould a rough shape of fibrous pulp, then drying out the water, impregnating the rough shape with a carboloid binder capable of undergoing a chemical change, curing said rough shape pulp forms in an open oven by the application of heat without confining the forms in moulds, then machining to substantially a finished size and finally polishing the last.

10. The process of making a shoe last, which consists in first forming in a mould a rough shape of fibrous pulp, then drying out the water, impregnating the rough shape with a carboloid binder capable of undergoing a chemical change, curing said rough shape pulp forms in an open oven by the application of heat without confining the forms in moulds, then machining to substantially a finished size, applying a coating of carboloid to the outer surface of the last and finally polishing the last after said outer coating has cured.

In testimony whereof, I affix my signature.

EDWARD L. AIKEN.